United States Patent
Sakai

(10) Patent No.: US 7,766,486 B2
(45) Date of Patent: Aug. 3, 2010

(54) PROJECTING APPARATUS AND METHOD AND RECORDING MEDIUM RECORDING THE PROJECTING METHOD

(75) Inventor: Mitsuo Sakai, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 955 days.

(21) Appl. No.: 11/504,022

(22) Filed: Aug. 14, 2006

(65) Prior Publication Data

US 2007/0058136 A1  Mar. 15, 2007

(30) Foreign Application Priority Data

Sep. 12, 2005  (JP) ............................. 2005-263785

(51) Int. Cl.
*G03B 21/14* (2006.01)
(52) U.S. Cl. ........................................ 353/69
(58) Field of Classification Search ................... 353/69, 353/70
See application file for complete search history.

(56) References Cited

U.S. PATENT DOCUMENTS

| 2004/0252283 A1 | 12/2004 | Ogawa |
| 2005/0030487 A1 | 2/2005 | Inoue |
| 2005/0078203 A1 | 4/2005 | Akutsu |
| 2005/0163396 A1 | 7/2005 | Morichika et al. |

FOREIGN PATENT DOCUMENTS

| JP | 2000-241874 A | 9/2000 |
| JP | 2004-341029 A | 12/2004 |
| JP | 2005-124131 A | 5/2005 |

OTHER PUBLICATIONS

Japanese Office Action dated Jun. 9, 2009 and English translation thereof issued in a counterpart Japanese Application No. 2005-263785.
Taiwanese Office Action dated Aug. 31, 2009, and English translation thereof, issued in counterpart Taiwanese Application No. 095133474, including Search Report.

*Primary Examiner*—Georgia Y Epps
*Assistant Examiner*—Danell L Owens
(74) *Attorney, Agent, or Firm*—Frishauf, Holtz, Goodman & Chick, P.C.

(57) ABSTRACT

An apparatus includes a projection system having a spatial light modulator and projection lens and configured to project a light image, an image capture system having an image capture lens and CCD and configured to capture a screen-direction image, a distance measuring sensor and distance measuring processing section configured to detect a distance and angle to the screen, a control section configured to, while extracting a screen frame position from the image obtained by the image capture system and, from respective detection results of the distance measuring and an angle-of-view detections, obtain a corrected value while referring to a correction table of a memory section storing corrected values of a parallax of the projection system and image capture system in a table form and match an image projected by the obtained corrected value to a screen frame position extracted.

16 Claims, 6 Drawing Sheets

PROJECTING APPARATUS AND METHOD AND RECORDING MEDIUM RECORDING THE PROJECTING METHOD

CROSS-REFERENCE TO RELATED APPLICATIONS

This application is based upon and claims the benefit of priority from prior Japanese Patent Application No. 2005-263785, filed Sep. 12, 2005, the entire contents of which are incorporated herein by reference.

BACKGROUND OF THE INVENTION

1. Field of the Invention

The present invention results to a recording apparatus and method and a recording medium for recording the projecting method which are suitable to a projector, etc.

2. Description of the Related Art

In some projectors for a liquid crystal system using a transmission type color LC panel as well as DLP (Digital Light Process-registered trademark) system using a reflection type spatial light modulator called a micro-mirror element, a correct rectangular aspect-ratio (for example, a vertical 3: a horizontal 4) image is actually projected in a deformed state, that is, in a state enlarged in a direction away from a project, due to an optical axis of a projecting lens system not set perpendicular to a screen plane as a projection target.

In order to correct such a deformed rectangular projected image, an image sensor, phase difference sensor, etc., are provided in the projector and a relative positional relation is obtained so as to grasp the generation state of the deformation. By doing so, a light image of a corresponding reverse-direction deformation is formed on a light image forming element, such as a color, LC panel, micro-mirror element, etc., to allow an image deformation to be cancelled on the image screen. This trapezoid correction technique has been adopted on an associated product or products.

Another projector is also known which is set opposite to a screen and it includes a monitor camera located at the front surface of the projector body to allow a focusing adjustment, a zooming adjustment to the screen frame, a trapezoid adjustment, etc., to be automatically done, a CPU configured to process the information of a video signal input from the monitor and calculate a focusing adjustment value, zooming adjustment value and a trapezoidal deformation adjustment value, a display drive section configured to adjust a projection lens for focusing, zooming and trapezoid deformation adjustment, and an input image data conversion section configured to convert an input image to display data and output a converted one to the display drive section (for example, Patent Document 1-JPN PAT APPLN KOKAI NO. 2000-241874).

The above-mentioned trapezoid correction technique is based on the concept of obtaining a projected image or an image projected screen state by an image sensor and phase difference sensor. Since, however, the image sensor, or a phase difference sensor, and an image projecting lens cannot naturally be arranged on the same axis and are arranged in front of the projecting apparatus in a state away therefrom.

However, a "parallax" problem arises according to a spaced-apart distance, thus lowering an accuracy with which trapezoid correction is made.

In addition, the trapezoid correction technique comprises partially compressing on otherwise deformed rectangular form and, by doing so, projecting an exact aspect-ratio rectangular form, so that, the greater the extent of deformation, the smaller the rectangular form to be projected after the correction is made.

BRIEF SUMMARY OF THE INVENTION

In one aspect of the present invention, there is provided a projecting apparatus comprising a projecting section having a zooming function to continuously vary a projection angle of view and configured to form a light image corresponding to an input image and project the image onto a screen as a projection target, an image capture section configured to capture a screen-direction image including a light image projected by projecting section, an extracting section configured to extract a screen frame position from an image obtained by the image capture section, a distance measuring section configured to detect a distance and angle to the screen, an angle-of-view detecting section configured to detect a projection angle of view of the projecting section, a memory section configured to store corrected values of a parallax of the projecting section and image capture section corresponding to the distance and angle to the screen and projection angle of view of the projecting section, and a projection control section configured to obtain a parallax corrected value from respective detection results of the distance measuring section and angle-of-view detecting section while referring to the storage section and match an image projected by the projecting section in a form to include an adjustment of the projection angle of view by the obtained corrected value to a screen frame position extracted by the extracting section.

In another aspect of the present invention there is provided a projecting apparatus comprising a projecting section having a zooming function to continuously vary a projection angle of view and configured to form a light image corresponding to an input image and project the image onto a screen as a projection target, a distance measuring section configured to detect a distance and angle to the screen, an angle-of-view detection section configured to detect a projection angle of view of the projecting section, a memory section configured to store corrected values of a parallax of the projecting section and distance measuring section initially in a table form corresponding to the distance and angle to the screen and projection angle of view of the projecting section, and a projection control section configured to obtain parallax corrected values from respective detection results of the distance measuring section and angle-of-view detecting section while referring to the memory section and make a trapezoid correction of an image projected by the projecting section in a form to include an adjustment of the projection angle of view from the obtained corrected value.

In another aspect of the present invention, there is provided a projecting method using a projecting apparatus including a projecting section having a zooming function to continuously vary a projection angle of view and configured to form a light image corresponding to an input image and project the image onto a screen as a project target and an image capture section configured to capture the screen-direction image including the light image projected by the projecting section, comprising an extracting step of extracting a screen frame position from the image obtained by the image capture section, a distance measuring step of detecting a distance and angle to the screen, a step of detecting a projection angle-of-view of the projecting section, and a projection control step of, from respective detection results of the distance measuring step and projection angle-of-view detecting step, obtaining parallax corrected values while referring to a storage section initially storing corrected values of a parallax of the projecting section and image capture section in a table form corresponding to the distance and angle to the screen and projection angle-of-view of the projecting section and matching an image projected by the projecting section in a form to include an adjustment of the projection angle of view by the obtained corrected value to the screen frame position extracted by the extracting step.

In another aspect of the present invention, there is provided a projecting method using a projecting apparatus including a projecting section having a zooming function to continuously vary a projection angle of view and project the image onto a screen as a projection target and a distance measuring section configured to detect a distance and angle to the screen, comprising a step of detecting a projection angle of view of the projecting section, and a projection control step of, from respective detection steps of the distance measuring step and angle-of-view detecting step, obtaining a parallax corrected value while referring to a memory section initially storing corrected values of a parallax of the projecting section and distance measuring section in a table form corresponding to the distance and angle to the screen and projection angle-of-view of the projecting section and making a trapezoid correction of the image projected by the projecting section in a form to include an adjustment of the projection angle of view by the corrected value obtained.

In another aspect of the present invention, there is provided a recording medium recording a projecting method using a projecting apparatus including a projecting section having a zooming function to continuously vary a projection angle and configured to form a light image corresponding to an input image and project the image onto a screen as a projection target and an image capture section configured to capture the screen-direction image including the light image projected by the projecting section, a computer program being incorporated into the projecting apparatus and configured to be run by an extracting step of extracting a screen frame position from the image capture section, a distance measuring step of detecting a distance and angle to the screen, an angle-of-view detecting step of detecting the projection angle of view of the projecting section and a projection control step of, from the distance measuring step and projection angle-of-view detecting step, obtaining a parallax corrected value while referring to a storage section initially storing corrected values of a parallax of the projecting section and image capture section in a table form corresponding to a distance and angle to the screen and projection angle of view of the projecting section and matching an image projected from the projecting section in a form including an adjustment of the projection angle of view by the obtained corrected value to the screen frame position extracted by the extracting step.

In another aspect of the present invention, there is provided a recording medium recording a projecting method using a projecting apparatus including a projecting section having a zooming function to continuously vary a projection angle of view and configured to form a light image corresponding to an input image and project the image onto a screen as a projection target and a distance measuring section configured to detect a distance and angle to the screen, a computer incorporated into the projecting apparatus and configured to be run by an angle-of-view detecting step of detecting a projection angle of view and a projection control step of, from respective detection results of the distance measuring section and angle-of-view detecting step, obtaining a parallax corrected value while referring to a memory section initially storing corrected values of a parallax of the projecting section and distance measuring section in a table form corresponding to the distance and angle to the screen and projection angle-of-view of the projecting section and making a trapezoid correction of an image projected by the projecting section in a form to include an adjustment of the projection angle of view by the corrected value obtained.

DETAILED DESCRIPTION OF THE INVENTION

First Embodiment

Figure 1:
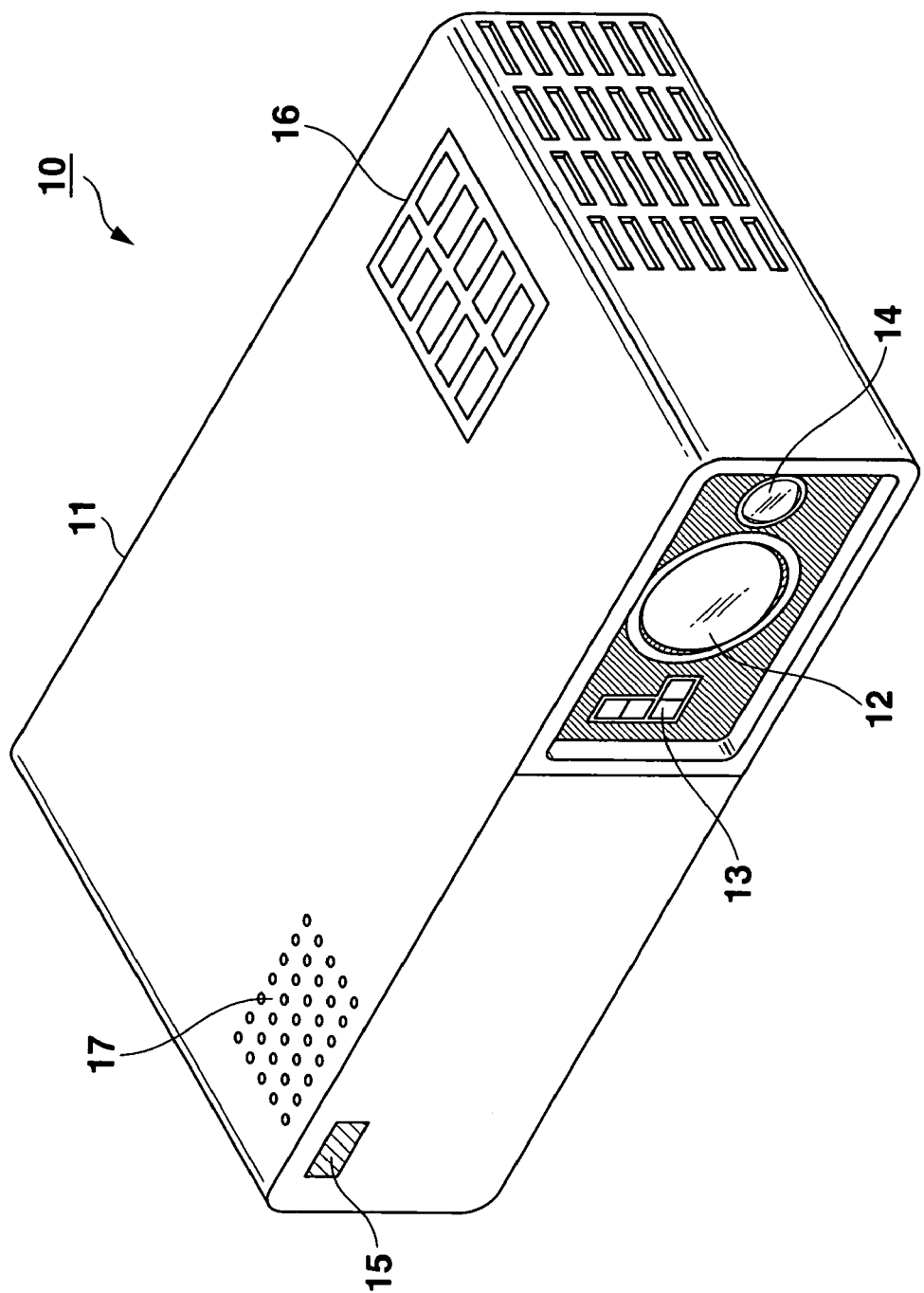
FIG. 1 is a perspective view showing an outer structure of a projecting apparatus according to a first embodiment of the present invention.

The first embodiment of the present invention applied to a projecting apparatus will be explained below with reference to the drawing.

FIG. 1 shows an outer structure of a projecting apparatus 10 according to the present embodiment and mainly the front and top surfaces of its housing. As shown in FIG. 1, in a facing right sidewall portion of a front of a body casing 11 of rectangular parallelepiped, a projection lens 12 (a projecting section), a distance measuring sensor 13 and an imaging lens 14 (an image capture section) are buried. Here, the distance measuring sensor 13 and imaging lens 14 are arranged near to each other with the imaging lens 12 in between. An Ir light receiving section 15 is located in a facing left sidewall portion of the front of the body casing 11.

The projection lens 12 is used to project on a target, such as a screen, a light image which is formed by a spatial light modulator such as a micro-mirror element as will be set out below. Here, it allows its just in-force position and zooming position (a projection angle of view) to vary properly.

The distance measuring sensor 13 has two pairs of phase difference sensors arranged in an orthogonal direction with one pair in a horizontal direction and the other in a vertical direction and is adopted to measure, based on an triangulation range principle, a distance from a parallax relative to a subject image to a predetermined light/dark pattern along a one-dimensional detection line.

The imaging lens 14 is arranged on a right end side portion adjacent to an array of the distance measuring sensor 13 and projection lens 12 and adopted to capture a display image projected by the projection lens 12 and includes a unifocal-lens optical system having an image capture angle of view of an extent enough to cover, even in a state with its projected angle of view set maximal by the zooming function of the projection lens 12, its projected range.

The Ir light receiving section 15 receives an infrared (Ir) light signal with a key operation signal coming from a remote controller, not shown, of the projecting apparatus 10 superimposed thereon.

On the upper surface of the body casing 11 are provided a key switch section 16 and a speaker 17.

The key switch section 16 comprises various kinds of key switches from which an instruction such as a power ON/OFF of the apparatus, an input switching, an automatic in-focus, an automatic trapezoid correction and so on, is input.

The speaker 17 generates, as a loud sound, an input sound signal and a beep sound at an operation time.

On the back sidewall section of the body casing 11, not shown, are provided an input/output connector section, an Ir light receiving section similar to the Ir light receiving section 15 as set out above and an AC adaptor connection section.

The input/output connection section includes, for example, a USB terminal for connection to an external device such as a personal computer, a video input RGB mini D-SUB terminal, S terminal and RCA terminal, and a stereo mini terminal for sound input.

A cable from an AC adaptor, not shown, is connected to an AC adaptor connection section and the AC adaptor serves as a power source.

The functional structure of an electronic circuit of the projecting apparatus 10 above will be explained below with reference to FIG. 2.

Figure 2:
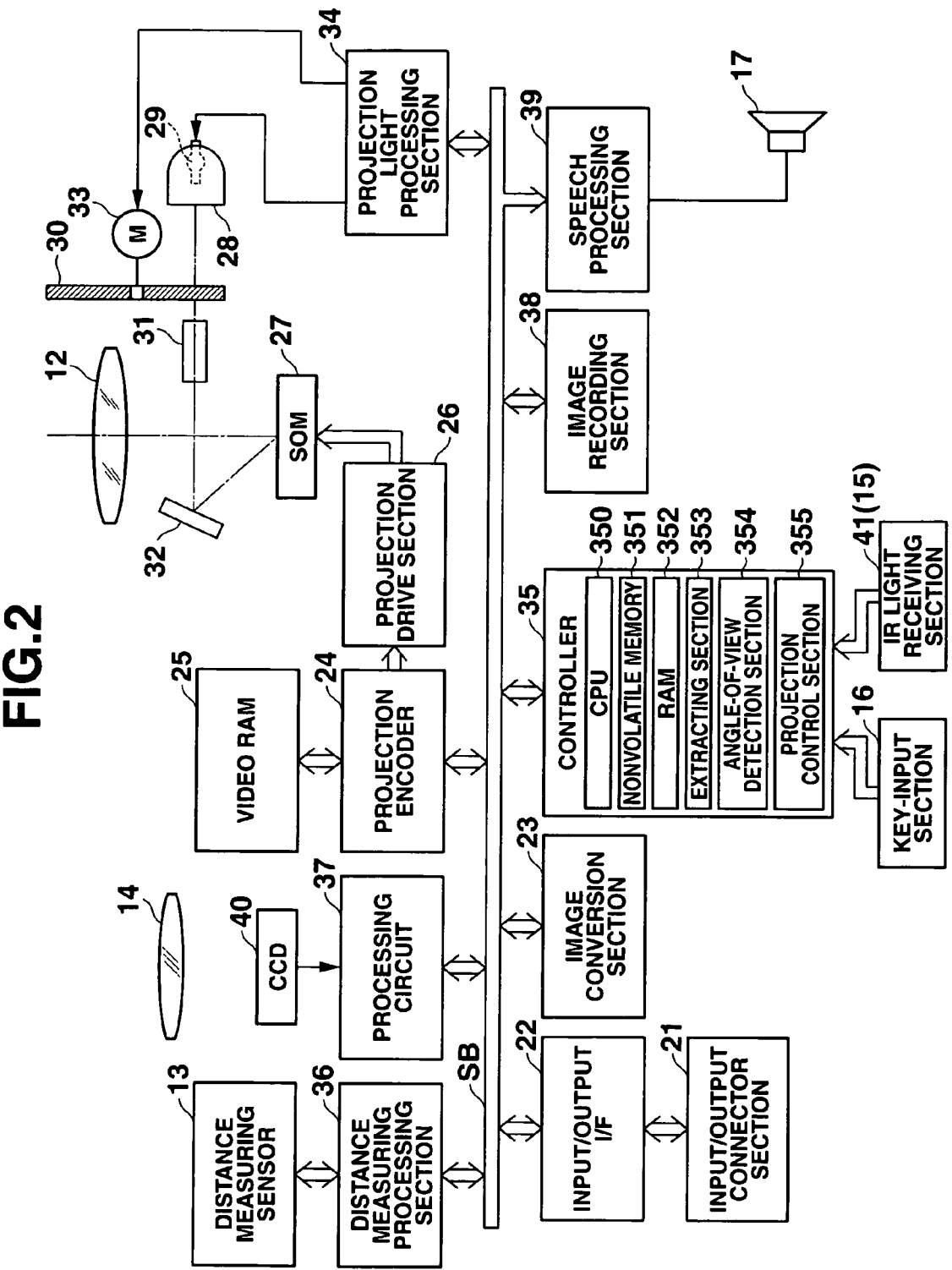
FIG. 2 is a block diagram showing a functional arrangement of an electronic circuit according to the first embodiment of the present invention.

In FIG. 2, various kinds of standard image signals which are input from the input/output connector section 21 are sent through an input/output interface (I/F) 22 onto a system bus SB and, after being unified by an image conversion section 23 to an image signal of a predetermined format, sent to a projection encoder 24.

The projection encoder 24 once stored the coming image signal in expanded form in a video RAM 25, generates a video signal from the stored contents of the video RAM 25 and outputs it to a projection drive section 26.

The projection drive section 26 display-drives, for example, a micro-mirror element of a spatial light modulator (SOM) 27 at a higher time division drive mode on a form multiplying a proper frame rate, such as 60 [frame/second], the color component division number and display gradation level number corresponding to the coming image signal.

By allowing high luminance white light which is exited from a light source lamp 29 (high pressure mercury lamp) set in a reflector 28 to be properly changed to primary colors through a color wheel 30, allowing them to be arranged to beams by an integrator 31 in a uniform luminance distribution and allowing them to be illuminated on the spatial light modulator 27 through the mirror 32, a light image is formed by their reflected light and projected/displayed on a screen, not shown, through the projection lens 12.

Any lighting drive of the light source lamp 29 and rotation drive of a motor (M) for rotationally driving the color wheel 30 are effected by a projection light processing section 34.

A controller 35 controls all the operations of each circuit. The controller 35 comprises a CPU 350, a nonvolatile memory 351 (memory section) for fixedly storing an operation program run by the CPU, including the processing of a later-described projection operation and image capture operation, later-described chart image data, parallax correction table, and so on, an extracting section 353 for extracting the frame position of the screen, an angle-of-view detection section 354 for detecting the projection angle of view, projection control section 355 for matchingly setting a projected image in the frame position of the screen, and a RAM 352 serving as a work memory.

To the controller 35 are connected, through the system bus SB, a distance measuring processing section 36 (distance measuring section), a processing circuit 37, an image recording section 38 and speech processing section 39.

The distance measuring processing section 36 control-drives the measuring sensor 13 comprising the two pairs of phase difference sensors as set out above and calculates a distance to any arbitrary position with the use of its detected output. The calculated distance value data is sent to the controller 35.

The processing circuit 37 receives an output of a CCD 40 serving as an image pickup element located at the back of an image capture optical axis of the image capture lens 14 to allow the photoelectric conversion of a light image focused at the image capture lens 14. The processing circuit 37 converts an image signal of an analog value from the CCD 40 to a digital one and, after performing color processing including pixel interpolation processing and γ correction processing, generates a luminance signal Y and color difference signals Cb, Cr and outputs these to the image conversion section 23 through the system bus SB.

The image conversion section 23 effects data compression of the luminance and color difference signals by ADCT, Huffman coding, etc., processing and writes the obtained image data into the image recording section 38 mounted as a recording medium of the projecting apparatus 10. The image recording section 38 comprises a nonvolatile memory such as a flash memory and records the image data obtained by an image capture.

The speech processing section 39 includes a sound source circuit such as a PCM sound source, effects an analog conversion of speech data given at a time of a projection operation and generates a loud sound under the speaker 17 or a beep sound as required.

It is to be noted that respective key operation signals on the key switch section 16 are input directly to the controller 35 and that a signal from the Ir light receiving section 41 is also input directly to the controller 35. The Ir light receiving section 41 includes the Ir light receiving section 15 and Ir light receiving section, which is provided at the back side of the body casing 11, and converts the infrared light receiving signal to a coded signal and sents it to the controller 35.

How, an explanation will be made below about the operation of the embodiment above.

Figure 3:
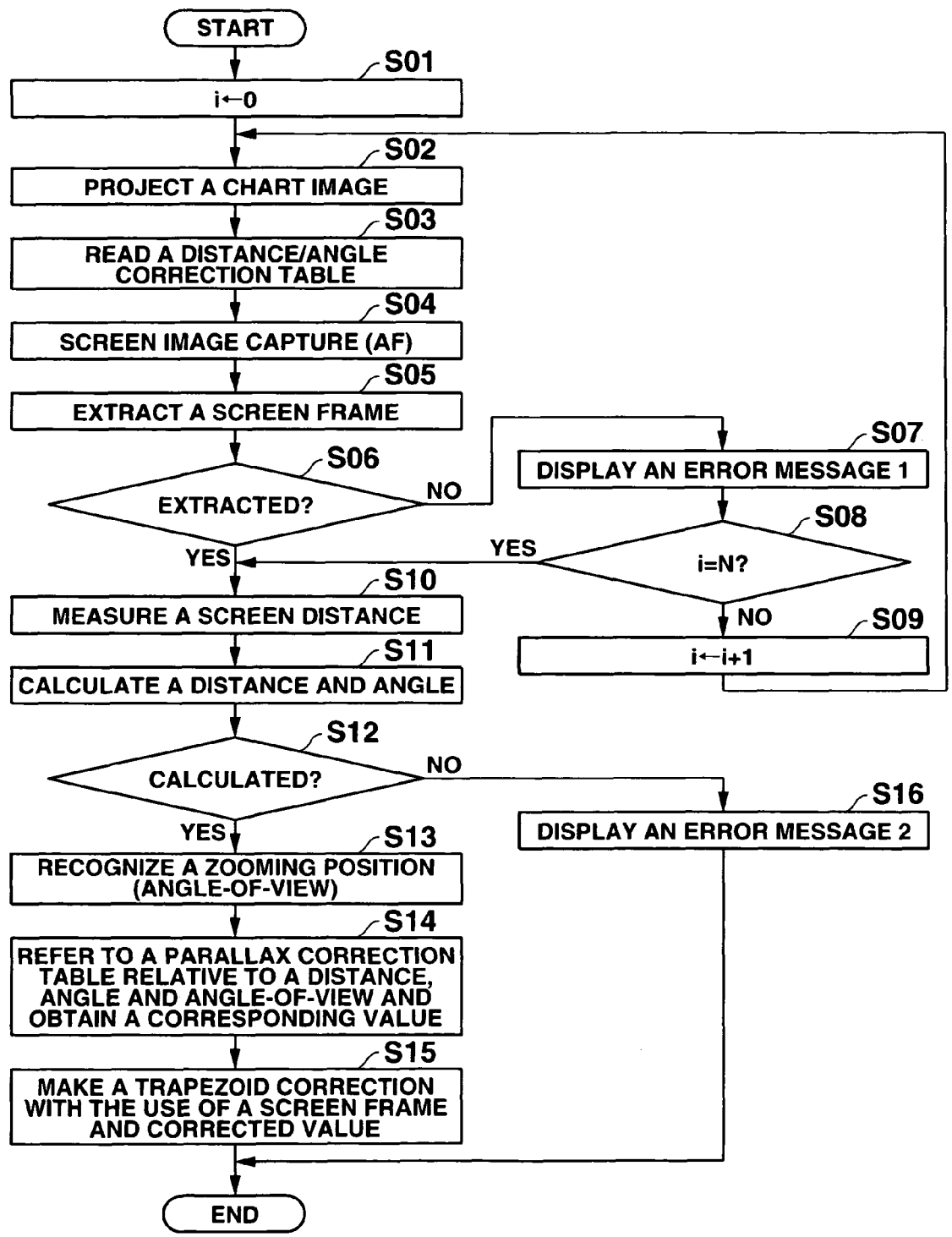
FIG. 3 is a flowchart showing the processing contents of a projection range adjusting operation at a starting time of turning on a power source in the first embodiment.

FIG. 3 shows the processing contents of the projection range adjusting operation automatically performed at the start of the projection operation, noting that all the operation control is performed under an operation program stored in the nonvolatile memory 351 of the controller 35.

First, an initial value [0] is set to a variable i for counting the number of trials done upon the extraction of the screen frame as a projection target—step S01.

Then chart image data stored in the nonvolatile memory 351 in the controller 35 is read to allow it to be stored in an expanded form in the video RAM 25 and its light image to be formed by the spatial light modulator 27 through the projection encoder 24 and projection drive section 26. When this is done, a chart image is projected by the projection lens 12 in the screen direction—step S02.

Here, as a chart image to be projected, use is made of one having, for example, a larger number of vertical white stripes (for horizontal measurement) arranged at equal intervals in a horizontal direction across the whole plane of the projection range and a larger number of lateral white stripes (for vertical measurement) arranged at equal intervals in a vertical direction across the whole plane of the projection range.

In the projected state of the chart image, a correction table formed with the correction values of a parallax corresponding to a distance and angle to the screen stored in the nonvolatile memory in the controller 35 is read to retain it in a work memory in the controller 35—step S03.

Then, under the work of an AF (autofocus) function, a screen including a chart image projected at this time is set to a just-in-focus state to capture its image—step S04.

Figure 4:
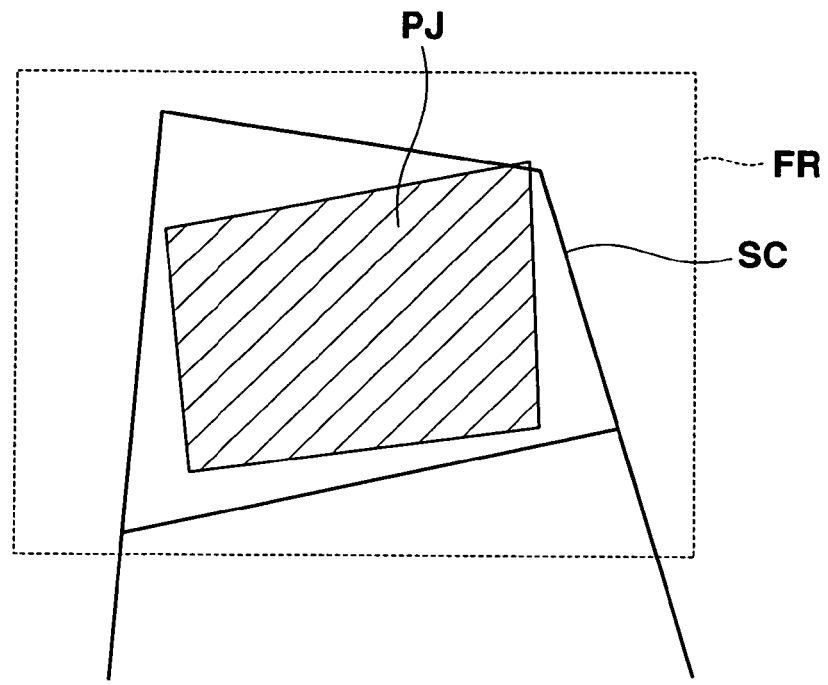
FIG. 4 illustrates an image capture range of an image capture system of the first embodiment and a positional relation of a screen frame and projected image.

FIG. 4 shows an explanation diagram for explaining the concept of the an image captured at this time. In FIG. 4, a range FR indicated by a rectangular form of a broken line is matched to an image obtained by the image capture and a form of a solid line in the range FR shows a frame SC of a screen as a projection target.

Here, it is assumed that, as a screen, use is made of a generally leg-equipped white board and, in FIG. 4, in addition to the frame section of an original screen, its leg sections are displayed, noting that the leg sections are shown projected out of the range FR.

In the screen frame SC, a projected image is shown as a range PJ indicated by right-up tilted coarse hatched lines and, at this time point, the predetermined chart image is projected there.

The failure of the screen frame SC and projection image PJ to be displayed as an exact rectangular form relative to the image capture range FR is due to the failure of the projection optical axis of the projection lens 12 to be set vertical to the plane of the screen frame SC, that is, due to the failure of the projecting apparatus 10 to be set exactly opposite to the screen frame SC. Here, the projecting apparatus 10 shows a state in which it projects an image at an angle of elevation from a left-down direction toward the screen frame SC.

After obtaining such a capture image, image processing is performed for extracting an area surrounded with the four sides of the screen frame SC from the image—step S05. As a result, decision is made whether or not the four sides of the screen frame SC were able to be extracted/recognized—Step S06.

Here, where the extraction of the four sides of the screen frame SC fails, for example, where similar colors of low contrast are involved between the screen frame SC and its background, a first error message to the effect that the extraction of the screen frame SC fails is projected/displaced during a predetermined time only in place of the chart image—Step S07. After confirming that the value of the variable i is not a restricted value N (for example, 3)—step S08, the value of the variable i is updated to i+1—step S09 and control goes again back to the step S02.

In the performing of repeated processing steps S02 to S09, where the four sides of the screen frame SC were able to be extracted from the captured image, this is decided at step S06 and distances to a plurality of points of the screen are measured by the distance measuring sensor 13 and distance measuring processing section 36 from the projected state of the chart image—step S10.

This comprises, in order to effect a cross-like scanning relative to the whole surface of the chart image for example, measuring the distances to those five points out of six points, that is, three points on a middle vertical line direction and three points on a middle lateral line direction, in which case one center intersection common point is included, and calculating from those measured distance values a tilt angle of the projection axis of the projection lens 12 relative to the plane of the screen—step S11. As a result of the calculation, decision is made whether or not both these distances and angle were able to be obtained—step S12.

Here, where the distances and angle were able to be obtained, then at this time point the projection angle of view is recognized from the zooming position of the projection lens 12 and the projection lens 12 is moved to such an optimal zooming position as to allow an image which is projected after the trapezoid correction to enter the screen frame SC—step S13.

Then with the use of the distances and angle calculated at step S11 and projection angle of view obtained at step S13, a corresponding parallax corrected value is obtained while referring to a parallax correction table read at step S03—step S14.

Figure 5:
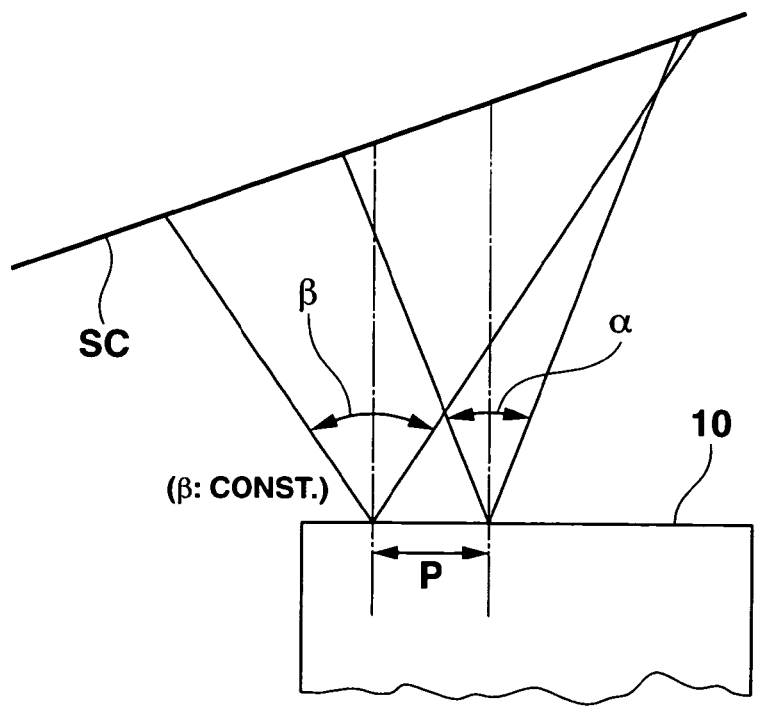
FIG. 5 illustrates a projection angle of a projection lens of the projecting apparatus according to the first embodiment and a positional relation of an image capture angle-of-view of an image capture lens and a screen frame.

FIG. 5 is a view for explaining the parallax corresponding to a positional relation between the mounted positions of the projection lens 12 and image capture lens 14 on the hand and the screen frame SC on the other. Here, with $\alpha$ indicating the projection angle of view of the projection lens 12 at this time, $\beta$ (fixed) a projection angle of view of the image capture lens 14 and p a distance between the projection lens 12 and the image capture lens 14 it can be understood that, due to the parallax produced by the distance p between the projection lens 12 and the image capture lens 14, a range allowing an image to be projected by the projection lens 12 within the screen frame SC and a range allowing an image to be captured by the image capture lens 14 always differ not only in the case where the projection angle of view a of the projection lens 12 and the image capture angle of view $\beta$ of the image capture lens 14 differ but also even in the case of these angles being equal.

However, the distance p between the projection lens 12 and the image capture lens 14 is constant according to a product of the projecting apparatus and any parallax produced varies due to the distance and angle relative to the screen frame SC and the zooming position (projection angle of view) $\alpha$ of the projection lens 12. Therefore, by initial storing the corrected values in a table form it is possible to correct the projection range in the image obtained with the use of the image capture lens 14 and perform correct trapezoid correction, etc., processing.

At step S14, a corresponding corrected value is obtained, while referring to the parallax correction table, according to the distance and angle to the projection plane obtained by the above-mentioned distance measuring sensor 13 and the projection angle of view 12. By performing trapezoid correction processing with the use of the such corrected value so as to allow the projection image PJ to be set within the projection screen SC, the projection image PJ is matched to the screen frame SC—step S15 and the sequential processing as shown in FIG. 3 is finished.

Further, if the value of the variable i is decided as becoming a restricted value N in such a state that any screen frame SC cannot be extracted from the image captured at step S08, then the processing for extracting the screen frame SC is stopped at that time point and control goes to the sequential processing at step S10.

If both a plurality of distances and angle are decided as having been unable to be obtained at step S12, reference cannot be made to the operation parallax correction table for the time being as a main reason for the displacement of the set position of the projecting apparatus 10 from a distance measuring range of the projection plane under the distance measuring sensor 13. Therefore, it is not possible to perform trapezoid correction processing for matching the projection range to the screen frame SC and a second error message is projected/displayed for a given time period, prompting the user to move the set position of the projecting apparatus—step S16. And the sequential processing shown in FIG. 3 is finished.

Thus the projection plane of the screen is effectively utilized according to the situation in which the projecting apparatus 10 is set. And it is possible to eliminate a bad effect of the parallax caused by the projection lens 12 and image capture lens 14 and to provide an easier-to-look projection by means of the trapezoid correction processing at an exact level.

Although, in the present embodiment, the projecting apparatus 10 has been explained as having the projection lens 12 for projecting an image on the front plane of the body casing 11, the distance measuring sensor 13 for measuring a plurality of distances to the projection plane and the image capture lens 14 for capturing a wider range including a projection image, the present invention cannot be restricted to the above-mentioned technique and it can be applied to a projecting apparatus which, for example, includes no image capturing lens 14, and, without performing extraction, etc., processing for extracting the screen frame SC from the capture image, performs trapezoid correction based on distances only to a plurality of points obtained by distance measuring sensors 13.

In this case, a correction table is initially stored in the internal memory of the controller 35 to allow the parallax which is produced from the positions of the projection lens 12 and distance measuring sensor 13 to be corrected from the distance and angle to the projection plane obtained by the distance sensor 13 and the projection angle of view of the projection lens 12. And by performing trapezoid correction processing of a projected image while referring to the correction table it is possible, though being not possible to match a projected image to the screen frame SC as in the embodiment above, to provide an exact and easier-to-look projection of a projected image own' aspect ratio on the basis of a relative positional relation between the projecting apparatus and the screen.

Even for a projecting apparatus 10 for performing trapezoid correction from a captured image, that is, for such an apparatus having an image capture lens 14 and not having the distance measuring sensor 13, it is possible to achieve the same object if a correction table is initially stored to correct the parallax of the projection lens 12 and image capture lens 14.

Second Embodiment

The second embodiment of the present invention as applied to the projecting apparatus will be explained below by referring to the drawing.

It is to be noted that the outer structure of a projecting apparatus according to the second embodiment and functional arrangement of its electronic circuit are basically the similar to that of FIG. 1 and that of FIG. 2, respectively, and their corresponding drawing and explanation are omitted for brevity sake.

The operation of the second embodiment will be explained below.

Figure 6:
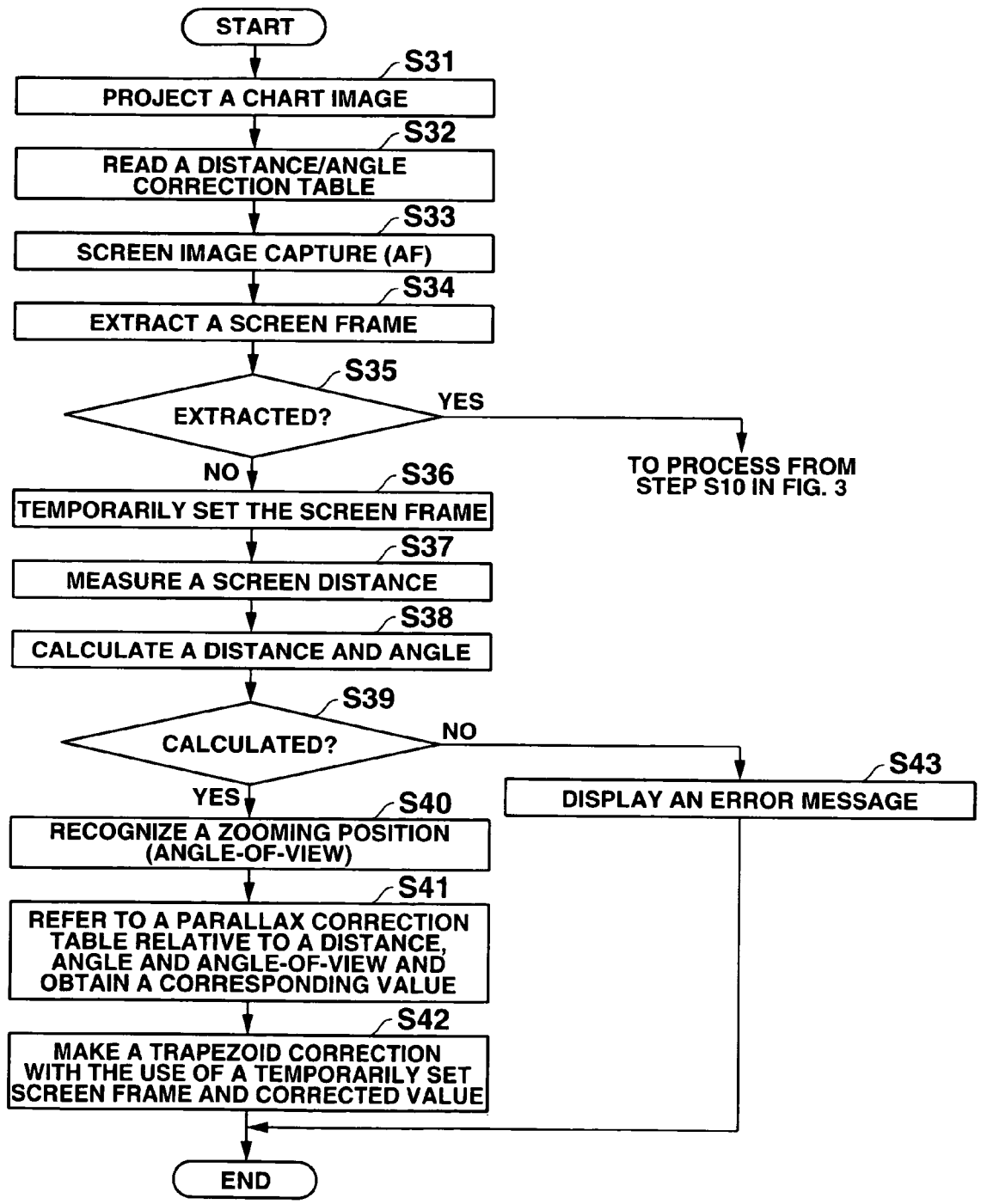
FIG. 6 is a flowchart showing processing contents of a projection range adjustment operation at a starting time of turning on a power source in a second embodiment of the present invention.

FIG. 6 shows the processing contents of a projection range adjusting operation automatically done at the start of the projection operation and its operation control is done under an operation program stored in an internal nonvolatile memory of a controller 35.

First, chart image data is read from the nonvolatile memory in the controller 35 and the data is stored on an expanded form in a video RAM 25. The data is sent through a projection encoder 24 and projection drive section 26 to a spatial light modulator 27 to provide a light image. By doing so, a chart image is projected by a projection lens 12 in a screen direction—step S31.

As a chart image to be projected, use is made of one having, for example, a larger number of vertical white stripes (for horizontal measurement) arranged at equal intervals in a horizontal direction across the whole plane of the projection range and a larger number of lateral white stripes (for vertical measurement) arranged at equal intervals in a vertical direction across the whole plane of the projection range.

In a projected state of the chart image, a correction table formed with the corrected values of a parallax corresponding to a distance and angle to the screen similarly stored in the nonvolatile memory in the controller 35 is read to retain it in a work memory in the controller 35—step S32.

Then, by the image capture system including an image capture lens 14, under the work of an AF (autofocus) function, a screen including the chart image projected at this time is set to a just-in-focus state to capture its image—step S33.

Figure 7:
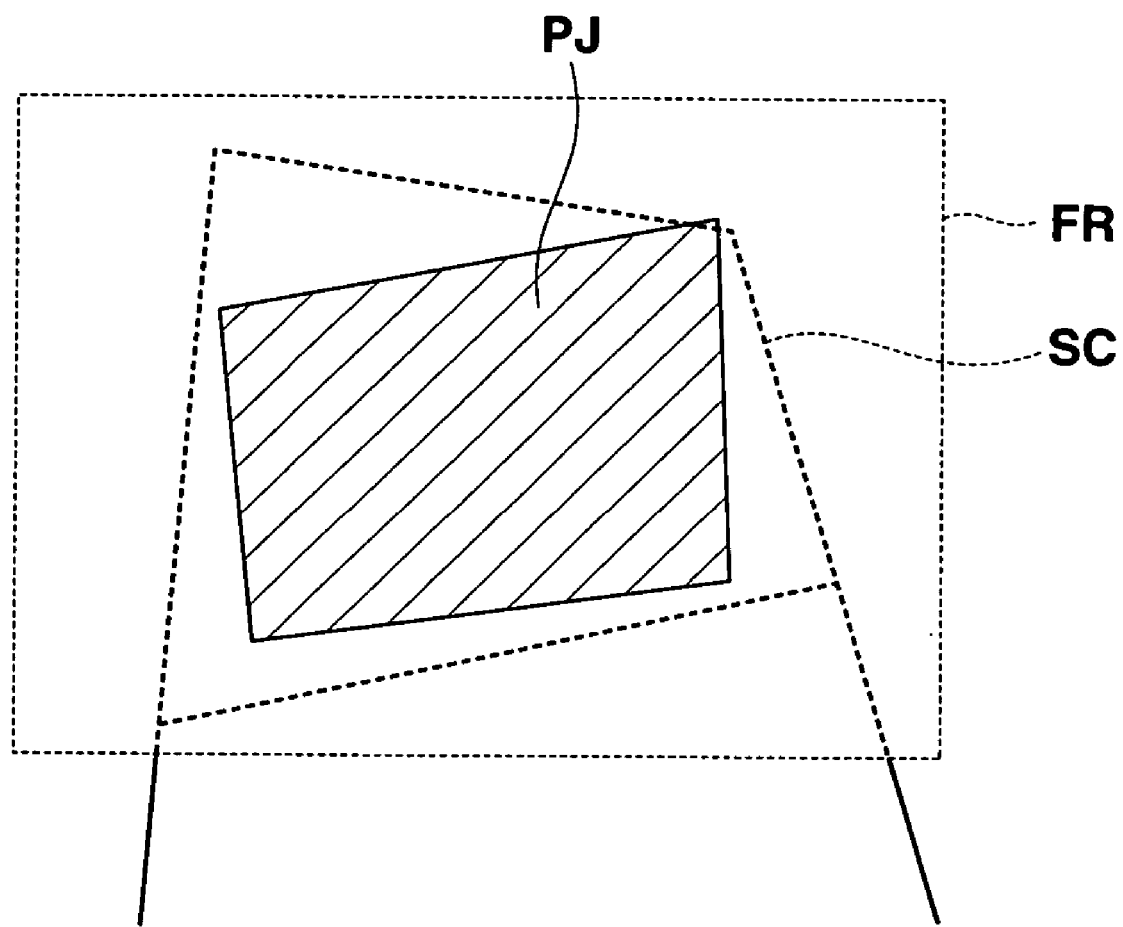
FIG. 7 is a view illustrating an image capture range of an image capture system of the second embodiment and a positional range of an image capture image and a screen frame.

FIG. 7 illustrates the concept of a capture image thus obtained. In FIG. 7, a range FR indicated by a rectangular form of an external broken line is matched to an image obtained by an image capture and a form indicated by a solid line in the range FR shows a frame SC of the screen as a projection target.

Here it is assumed that, as a screen, use is made of a generally leg-equipped white board and, in FIG. 7, in addition to the frame section of an original screen, its leg sections are displayed, noting that the leg sections are shown projected out of the range FR above.

In addition, the screen frame SC is represented by the broken line in a low contrast level relative to the background. In the screen frame SC, a projected image is shown by a range PJ indicated by right-up coarse hatched lines and, at this time point, the predetermined chart image is projected there.

The failure of the screen frame SC and projected image PJ to be displayed as an exact rectangular form each relative to the image capture range FR is due to the failure of the projection optical axis of the projection lens 12 to the plane of the screen frame SC, that is, due to the failure of the projecting apparatus 10 to be set exactly opposite to the screen frame SC. Here, the projecting apparatus 10 shows a state in which it projects an image at an angle of elevation from a left-down direction toward the screen frame SC.

After obtaining such a capture image, image processing is done for extracting an area surrounded with the four sides of the screen frame SC from the image—step S34. As a result, decision is made whether or not the four sides of the screen frame SC was extracted/recognized—step S35.

Here, where the four sides of the screen frame SC were able to be extracted, the sequential processing at step S10, etc., is done, the detailed explanation being omitted here.

As shown in FIG. 7, for example, where similar colors of low contrast are involved between the screen frame SC and its background, it is not possible to exactly extract the four sides of the screen frame SC. Since, however, the screen frame SC is roughly recognized, such decision is made at step S35 and it is set as a screen frame instead—step S36.

After this, distances to a plurality of points of the screen are measured, by the distance measuring sensor 13 and distance measuring processing section 36, from a state in which the chart image is projected—step S37.

This comprises, in order to effect a cross-like scanning relative to the whole plane of the chart image for example, measuring the distances to five points out of six points, that is, three points on a middle vertical line direction and three middle lateral line direction, in which case one center intersection common point is included, and calculating, from those measured distance values a tilt angle of the projection axis of the projection lens 12 relative to the plane of the screen—step S38. As a result of the calculation, decision is made whether or not both these distances and angle were able to be obtained—step S39.

Here, where the distances and angle were able to be obtained, then at this time point the projection angle of view is recognized from the zooming position of the projection lens 12 and the projection lens 12 is moved to such an optimal zooming position as to allow an image which is projected after the trapezoid correction to enter the set screen frame SC—step S40.

Then, with the use of the distances and angle calculated at step S38 and projection angle of view obtained at step S40, a corresponding parallax corrected value is obtained while referring to a parallax correction table read at step S32—step S41.

According to the distance and angle to the projection plane obtained by the distance measuring sensor 13 and projection angle of view of the projection lens 12, a corresponding corrected value is obtained while referring to the parallax correction table. By performing trapezoid correction processing with the use of the corrected value so as to allow the projected image PJ to be fully set to the screen frame SC (set replacement frame), the projected image PJ is matched to the screen frame SC (set replacement frame)—step S42 and the sequential processing as shown in FIG. 6 is finished.

If both a plurality of distances and angle are decided as having been unable to be obtained at step S39, reference cannot be made to the operation parallax correction table for the time being as a main reason for the displacement of the set position of the projecting apparatus 10 from a distance measuring range of the projection plane under the distance measuring sensor 13 and it is not possible to perform trapezoid correction processing for matchingly setting the projection range to the screen frame SC. Therefore, an error message is projected/displayed for a given time only to prompt the user to move the set position of the projecting apparatus 10—step S43 and the sequential processing as shown in FIG. 6 is finished.

Even if at the capture of a projected image-containing range the screen frame cannot be extracted from the capture image, it is possible to roughly recognize the frame of screen and, by the trapezoid correction processing for matchingly setting the screen frame to the fullest possible extent, it is possible to enhance the positional accuracy of an image.

Although the first and second embodiments have been explained as being applied to a DLP (trademark) system projecting apparatus, the present invention is not restricted to these embodiments and can also be applied to a liquid crystal projector using, for example, a transmission type color liquid crystal panel.

The present invention cannot be restricted to the above-mentioned embodiments and can be variously changed or modified within a range not departing from the essence of the present invention.

Further, the present embodiments include the invention or inventions in various stages and various inventions can be extracted by properly combining together a plurality of essential constituent elements disclosed. Even if, for example, some of all the constituent elements are eliminated, at least one of the tasks as set out in the Brief Summary of the Invention can be solved and, where at least one of effects as set out in the Summary of the Invention is obtained, the remaining constituent elements can be extracted as an invention.

What is claimed is:

1. A projecting apparatus comprising:
    a projecting section having a zooming function to continuously vary a projection angle of view and configured to form a light image corresponding to an input image and project the image onto a screen as a projection target;
    an image capture section configured to capture a screen-direction image including the light image projected by the projecting section;
    an extracting section configured to extract a screen frame position from the image obtained by the image capture section;
    a distance measuring section configured to detect a distance to the screen and an angle with respect to the screen;
    an angle-of-view detecting section configured to detect the projection angle of view of the projecting section;
    a memory section configured to store corrected values, which are corrected for parallax of the projecting section and the image capture section, the corrected values being stored in a table to correspond to the distance to the screen and angle with respect to the screen and the projection angle of view of the projecting section; and
    a projection control section configured to refer to the memory section and obtain a parallax corrected value based on respective detection results of the distance measuring section and the angle-of-view detecting section, and to correct a projection range of an image projected from the projecting section based on the obtained corrected value in order to match the image projected from the projecting section to the screen frame position extracted by the extracting section;
    wherein, when the extracting section is unable to extract the screen frame position, an error message is projected for a given period.

2. A projecting apparatus according to claim 1, wherein the extracting section is configured to, when the extracting section is unable to extract the screen frame position, set a corresponding assumed screen frame position as a screen frame position, and the projection control section is configured to adjust the projection angle of view based on the set screen frame position and perform a trapezoid correction of the image projected by the projecting section based on respective detection results of the distance measuring section and the angle-of-view detecting section.

3. A projecting apparatus according to claim 1, wherein the projecting section projects a chart image on the screen, and the extracting section extracts the screen frame position and the distance measuring section detects the distance to the screen and angle with respect to the screen after the chart image is projected on the screen.

4. A projecting apparatus according to claim 3, wherein, as the chart image, use is made of a stripe pattern for a horizontal measurement and for a vertical measurement.

5. A projecting apparatus according to claim 1, wherein an error message is projected for a given period when the distance measuring section cannot detect the distance to the screen and angle with respect to the screen.

6. A projecting apparatus comprising:
    a projecting section having a zooming function to continuously vary a projection angle of view and configured to form a light image corresponding to an input image and project the image onto a screen as a projection target;
    an image capture section configured to capture a screen-direction image including the light image projected by the projecting section;

an extracting section configured to extract a screen frame position from the image obtained by the image capture section;

a distance measuring section configured to detect a distance to the screen and an angle with respect to the screen;

an angle-of-view detecting section configured to detect the projection angle of view of the projecting section;

a memory section configured to store corrected values, which are corrected for parallax of the projecting section and the distance measuring section, the corrected values being stored in a table to correspond to the distance to the screen and angle with respect to the screen and the projection angle view of the projecting section; and a projection control section configured to refer to the memory section and obtain a parallax corrected value based on respective detection results of the distance measuring section and the angle-of-view detection section, and to make a trapezoid correction of an image projected from the projecting section based on the obtained corrected value in order to match the image after trapezoid correction to the screen frame position extracted by the extracting section;

wherein, when the extracting section is unable to extract the screen frame position, an error message is projected for a given period.

7. A projecting apparatus according to claim 6, wherein the projecting section projects a chart image on the screen, and the distance measuring section detects the distance to the screen and angle with respect to the screen after the chart image is projected on the screen.

8. A projecting apparatus according to claim 7, wherein, as the chart image, use is made of a stripe pattern for a horizontal measurement and for a vertical measurement.

9. A projecting method using a projecting apparatus which comprises a projecting section having a zooming function to continuously vary a projection angle of view and configured to form a light image corresponding to an input image and project the image onto a screen as a projection target, and an image capture section configured to capture a screen-direction image including the light image projected by the projecting section, the method comprising:

extracting a screen frame position from the image obtained by the image capture section;

detecting a distance to the screen and an angle with respect to the screen;

detecting the projection angle of view of the projecting section;

referring to a memory section, which stores corrected values, which are corrected for parallax of the projecting section and the image capture section, the corrected values being stored in a table to correspond to the distance to the screen and angle with respect to the screen and the projection angle of view of the projecting section, and obtaining a parallax corrected value from the memory section based on the detected distance to the screen and angle with respect to the screen and the detected projection angle of view; and correcting a projection range of an image projected from the projecting section based on the obtained corrected value in order to match the image projected from the projecting section to the extracted screen frame position;

wherein, when the screen frame position cannot be extracted, an error message is projected for a given period.

10. A projecting method according to claim 9, wherein, when the screen frame position cannot be extracted, a corresponding assumed screen frame position is set as a screen frame position, the projection angle of view is adjusted based on the set screen frame position, and a trapezoid correction is made on the image projected by the projecting section based on the detected distance to the screen and angle with respect to the screen and the detected projection angle of view.

11. A projecting method according to claim 9, wherein when the distance to the screen and angle with respect to the screen cannot be detected, an error message is projected for a given period.

12. A projecting method using a projecting apparatus which comprises a projecting section having a zoom function to continuously vary a projection angle of view and configured to form a light image corresponding to an input image and project the image onto a screen as a projection target, an image capture section configured to capture a screen-direction image including the light image projected by the projecting section, and a distance measuring section configured to detect a distance to the screen and an angle with respect to the screen, the method comprising:

extracting a screen frame position from the image obtained by the image capture section;

detecting the distance to the screen and the angle with respect to the screen;

detecting the projection angle of view of the projecting section;

referring to a memory section, which stores corrected values, which are corrected for parallax of the projecting section and the distance measuring section, the corrected values being stored in a table to correspond to the distance to the screen and angle with respect to the screen and the projection angle of view of the projecting section, and obtaining a parallax corrected value from the memory section based on the detected distance to the screen and angle with respect to the screen and the detected projection angle of view; and performing a trapezoid correction of the image projected from the projecting section based on the obtained corrected value in order to match the image after trapezoid correction to the extracted screen frame position;

wherein, when the screen frame position cannot be extracted, an error message is projected for a given period.

13. A computer readable recording medium storing a program that is executable by a computer in a projecting apparatus which comprises a projecting section having a zooming function to continuously vary a projection angle of view and configured to form a light image corresponding to an input image and project the image onto a screen as a projection target, and an image capture section configured to capture a screen-direction image including the light image projected by the projecting section, the program being executable by the computer to control the projecting apparatus to perform functions comprising:

extracting a screen frame position from the image obtained from the image capture section;

detecting a distance to the screen and an angle with respect to the screen;

detecting the projection angle of view of the projecting section;

referring to a memory section, which stores corrected values, which are corrected for parallax of the projecting section and the image capture section, the corrected values being stored in a table to correspond to the distance to the screen and angle with respect to the screen and the projection angle of view of the projecting section, and obtaining a parallax corrected value from the memory section based on the detected distance to the screen and angle with respect to the screen and the detected projection angle of view; and correcting a projection range of an image projected from the projecting section based on the obtained corrected value in order to match the image projected from the projecting section to the extracted screen frame position;

wherein, when the screen frame position cannot be extracted, an error message is projected for a given period.

14. A computer readable recording medium according to claim 13, wherein, when the screen frame position cannot be extracted, a corresponding assumed screen frame position is set as a screen frame position, the projection angle of view is adjusted based on the set screen frame position, and the image projected by the projecting section is trapezoid-corrected based on the detected distance to the screen and angle with respect to the screen and the detected projection angle of view.

15. A computer readable recording medium according to claim 13, wherein when the distance to the screen and angle with respect to the screen cannot be detected, an error message is projected for a given period.

16. A computer readable recording medium storing a program that is executable by a computer in a projecting apparatus which comprises a projecting section having a zooming function to continuously vary a projection angle of view and configured to form a light image corresponding to an input image and project the image onto a screen as a projection target, an image capture section configured to capture a screen-direction image including the light image projected by the projecting section, and a distance measuring section configured to detect a distance to the screen and an angle with respect to the screen, the program being executable by the computer to control the projecting apparatus to perform functions comprising:

extracting a screen frame position from the image obtained by the image capture section;

detecting the distance to the screen and the angle with respect to the screen;

detecting the projection angle of view of the projecting section;

referring to a memory section, which stores corrected values, which are corrected for parallax of the projecting section and the distance measuring section, the corrected values being stored in a table to correspond to the distance to the screen and angle with respect to the screen and the projection angle of view of the projecting section, and obtaining a parallax corrected value from the memory section based on the detected distance to the screen and angle with respect to the screen and the detected projection angle of view; and performing a trapezoid correction of the image projected from the projecting section based on the obtained corrected value in order to match the image after trapezoid correction to the extracted screen frame position;

wherein, when the screen frame position cannot be extracted, an error message is projected for a given period.

* * * * *